United States Patent

Mercier

[11] Patent Number: 5,837,143
[45] Date of Patent: *Nov. 17, 1998

[54] PROCESS AND DEVICE FOR THE MAGNETIC TREATMENT OF A FLUID

[75] Inventor: Dominique Mercier, Meudon-la-Forêt, France

[73] Assignee: Codiex SNC, Puteaux, France

[*] Notice: The portion of the term of this patent subsequent to Apr. 3, 2009, has been disclaimed.

[21] Appl. No.: 307,320

[22] Filed: Sep. 16, 1994

Related U.S. Application Data

[63] Continuation of Ser. No. 844,669, filed as PCT/FR90/00733 Oct. 12, 1990, Pat. No. 5,364,536.

[30] Foreign Application Priority Data

Oct. 13, 1989 [FR] France .................................. 89 13386
Apr. 11, 1990 [FR] France .................................. 90 04680

[51] Int. Cl.[6] ...................................................... C02F 1/48
[52] U.S. Cl. ........................................... 210/695; 210/222
[58] Field of Search .................................... 210/222, 223, 210/695; 123/536, 538; 96/1; 95/28; 335/303

[56] References Cited

U.S. PATENT DOCUMENTS

| | | | |
|---|---|---|---|
| 3,051,988 | 9/1962 | Baermann | 335/303 |
| 3,719,583 | 3/1973 | Ustick | 210/695 |
| 3,875,061 | 4/1975 | Palma | 210/223 |
| 4,343,707 | 8/1982 | Lucas | 210/695 |
| 4,605,523 | 8/1986 | Smillie | 123/538 |
| 4,999,106 | 3/1991 | Schindler | 210/222 |

FOREIGN PATENT DOCUMENTS

| | | | |
|---|---|---|---|
| 2317013 | 2/1977 | France | 210/696 |
| 1139599 | 11/1962 | Germany | 210/222 |
| 3618174 | 12/1987 | Germany . | |
| 189991 | 10/1984 | Japan | 210/222 |
| 1159896 | 6/1985 | Russian Federation | 210/222 |
| 2206064 | 12/1988 | United Kingdom . | |

Primary Examiner—Matthew O. Savage
Attorney, Agent, or Firm—McAulay Fisher Nissen Goldberg & Kiel, LLP

[57] ABSTRACT

A process and a device for the magnetic treatment of fluid as the fluid moves in successive magnetic fields, including a sheet having adjacent transverse bands each of the same width. Each band is charged with magnets oriented alternatively NS/SN or NNSS/SSNN perpendicularly to the plane of the sheet so that successive transverse bands adjacent to each other present upper polar faces alternately having polarities S, N, S, N . . . S,N or S,S, N,N, S,S, N,N, . . . S,S, N,N.

5 Claims, 2 Drawing Sheets

5,837,143

PROCESS AND DEVICE FOR THE MAGNETIC TREATMENT OF A FLUID

This application is a continuation of application Ser. No. 07/844,669, filed as PCT/FR90/00733 Oct. 12, 1990, and now issued to Dominique MERCIER as U.S. Pat. No. 5,364,536 on Nov. 15, 1994.

The present invention has for its object a process for the magnetic treatment of a fluid, to devices for carrying out this process and to certain fluids treated by this process and/or these devices.

In the present Patent Application, "fluid" will designate any physical form of products capable of flow, which covers liquids and gases, but also super-critical fluids as well as products in intermediate states such as hardly viscous pastes, creams, products in the vitreous state, pulverulent products or mixed products such as solid pulverulent particles in suspension in a gas or a liquid (fluidized bed for example) and in general all products presenting one or more phases but of which the overall behaviour is a behaviour of the fluid type in the conventional sense of the term, i.e. capable of flowing by any usual means such as gravity or a difference in pressure without it being absolutely necessary to employ an additional means of propulsion. Virtually, the invention is essentially applied to any fluid, in the sense which has just been defined, which, in the course of a natural or possibly forced flow circulation, makes it possible to create a relative movement between solid elements, fixed or not, and the constituents of the fluid, in particular the particles which constitute it or which it conveys. More precisely, the invention is based on the fact that the constituents of one or more fluids, still in the sense which has just been defined, are capable of circulating in relative manner in magnetic fields created by permanent magnets or by means creating by induction or by any other adequate means magnetic fields, such as for example electromagnets.

It is known in the prior art that very diverse products are modified by certain magnetic fields, whether it is question of electrically charged products, such as ionized solutions, or products which are relatively neutral electrically, such as micro-organisms in a fluid medium, organic or not. Among the innumerable varieties of actions exerted, it is well known that the magnetic fields act on the electrically non-neutral particles and consequently on the electric currents. This is the very base of the principles evidenced by Ampère and which are employed in very numerous apparatus and very numerous machines and in particular in electrical rotating machines. It is also known that such fields act on the fluid media in the sense which has been defined hereinabove. Generally, magnetic or electric, even electrostatic fields are used to modify or induce charges and to create deviations, separations, decantations, modifications and other physical, mechanical or even biological phenomena.

Concerning more particularly certain neutral bodies, such as micro-organisms or certain molecules, for the most part of biological origin, the electromagnetic fields may modify them, which is the basis of very numerous techniques, such as liquid crystals, or of biotechnology techniques and making it possible, for example, to render inactive certain micro-organisms. It is also known in the prior art that the magnetic fields may exert an action on solutions, in particular by mobilizing the ions that they contain; this principle has already been used in devices for protecting networks for distributing water under pressure for domestic use.

The present invention has for its object to extend the domain of application of these principles of magnetic treatment of fluids in order to eliminate the detrimental properties of fluids in general and in particular of water and of air which are the most current examples, for example by tending to cancel the noxious effects of the compounds that they may convey in the state of solution, of suspension or the like, as well as the micro-organisms that they may transport. This may concern phenomena as diverse as scaling by the mineral salts in solution in the water which tend to be deposited and even to be incrusted, up to the micro-organisms in the water-distribution or air-conditioning installations which may propagate certain disorders in particular in the human being or in the other living beings which may be in contact with these fluids. It is certain that, furthermore, many installations, and in particular domestic installations, are deteriorated by accumulations of scale and other incrustations and by developments of colonies of micro-organisms generally in corners which are of difficult access for cleaning. The present invention will therefore preferably have an important action on the solutions, suspensions, colloids and the like. It should be recalled on this subject that the use of electrostatic fields is well known in certain domains of treatment, particularly of gases, for example in dust-removing devices. The present invention does not concern these electrostatic fields, but it essentially concerns magnetic fields, including electromagnetic fields.

It will also be recalled that, as Ampere demonstrated, when an electric current is created by displacement of a charged particle, such as an electron or even an ion, any magnetic field will tend to deviate the current resulting from this displacement. It will be recalled that, if a negative charge is displaced, it is conventionally considered that the electric current goes in the direction opposite the displacement of the negative charge and that, if the electric current passes in the direction from the feet to the head of an observer, the magnetic field going from the rear to the front of this observer, the resultant force tends, for the observer, to a displacement of the electric current towards the left. On the basis of this well known principle,. it is therefore known to determine the orientations that must be given to magnetic fields of defined polarization to displace a current of positive or negative charges in one direction or in the opposite direction. It is therefore simply for the man skilled in the art to define the orientation to be given, for example, to a permanent magnet and therefore to the position of its North and South poles, for example, to move a flow of positive or negative charges away from the wall of a recipient.

However, experience has shown the Applicant of the present Application that it was not sufficient, for example, to create a magnetic field tending to move the ions away from the wall of a tube or a recipient in order to avoid scaling, especially if the latter is at least in part pre-existent. Conditions, which are at the basis of the present invention, are necessary.

Experience has also proved that, when a magnetic system for protecting a water distribution network is used, the anti-scaling characteristics of the water tend to disappear as soon as they leave the protected part of the network, i.e. when they arrive in the atmosphere and at the pressure thereof. The well known precipitations of certain colloids and of certain salts are then observed, which provokes concretions and scalings which are further increased by the temperature or the use of certain washing compounds. These phenomena are all the more detrimental as, in the domestic uses of water, it is generally the apparatus of the washing machine, dish-washer, kettle, W.C. tank, kitchen-, toilet-, shower room-, bathroom equipment type, in which these disorders are manifested in the most flagrant and most detrimental manner. In particular, in dish-washers and in washing machines, situations are reached such that not only the washing leaves everything to be desired, but also, very often and in particular on the dishes where this appears extremely clearly, deposits are produced, hence the use of anti-scale, anti-calcareous, anti-deposit products or of products increasing the salvation or the solvent power, of which the results are generally far from being conclusive.

Applicant's experience has shown that considerable variations in the magnetic field acted particularly favourably both on ionized particles and on certain neutral constituents and in particular on certain micro-organsisms. Now, such magnetic field variations may be variations both in the intensity of the field and, of course, in its orientation or sign, and also, in a succession of modifications of the field. The frequency of these modifications then performs a non-negligible role: during the displacement of an element, charged or not, the passage from a zone with relatively low magnetic field, such as for example the magnetic field of the earth, to a zone where a considerable magnetic field prevails, such as for example that created by a permanent magnet or by an electro-magnet, may cause a certain number of phenomena apart from the well known one resulting from Ampere's law. Experience has demonstrated that the bursting of certain agglomerates was observed, the mobilization of constituents tending to precipitate or to decant, the inhibition of processes of development and of bacterial, microbial, viral or other biological action, such modifications being such that, contrary to what happened in the prior techniques, a certain durability of the properties in time may be attained. In particular, this is the case when bacteria are inhibited. If it is imagined that a sudden change in the intensity of a magnetic field may provoke such reactions, it is obvious that a series of successive changes of the same polarity or of opposite polarities, of changes of intensity of the alternate field between two given values or between very variable values, allow more important results. Now, tests-have demonstrated that, depending on the case, in electromagnetic waves, important actions were obtained both with low frequencies and with very high frequencies such as centimeter waves for example which is, of course, in the present state of affairs, inapplicable simultaneously. In the following and in order not to create confusion when one speaks of a "wave length", it is question of its definition in the conventional sense of the term, i.e. a wave length is considered as the distance between two consecutive points of the same phase of a fixed (or stationary) or mobile, rectilinear undulation. This is understood to imply a certain relative displacement between the reference and the wave. Now, as will be seen in the present invention, this notion is applied both to magnetic fields which may be considered as fixed in space but with respect to which a fluid is in relative displacement, and in cases where the magnetic field is itself in absolute displacement but also in relative displacement with respect to the fluid which, for its part, may possibly be stationary. Thus, as will be seen hereinafter and in accordance with the present invention, electromagnetic low frequency and high frequency may be conciliated by acting on the relative movements of the devices creating magnetic fields, and therefore the magnetic fields created on the one hand and the fluids to be treated on the other hand.

The object of the present invention is therefore to propose a process and devices for carrying out the process, for creating considerable and possibly repetitive modifications, depending on constant or variable criteria, which may act on neutral or charged particles. In the following and to fix ideas, examples will be considered in which the fields may be considered as fixed in space and the particles mobile, as well as cases where the particles are mobile and even possibly fixed with respect to fields in movement. In all cases, this is translated by the relative movement between the fluid vector of the particles and the magnetic field(s). Furthermore, "particles" will designate hereinafter any physical element, charged or not, going from the range of elementary particles of matter, i.e. for example electrons or ions, up to visible particles such as dust, powders or micro-organisms. Concerning the living organisms, one will not enter into the details of the different actions of the magnetic fields, which, of course, depend very largely on the nature of the organisms considered, the majority having an electrically neutral reaction but certain may present molecular systems reacting to magnetic fields whether they be charged or not. For example, it has been observed that certain micro-organisms burst in certain magnetic fields, which, of course, is the most efficient way of inhibiting them. Experience has shown that the devices and processes according to the invention proved particularly efficient against plankton and equivalents, which is of high interest both from the point of view of the environment and in all cases where basins, fountains, swimming pools are used, and particularly in large water-treatment installations and in particular sea water.

Moreover, it is obvious that fluids, in particular waters, treated by the process and the devices according to the invention, may present sufficiently modified physical, chemical and biological characteristics to constitute novel industrial products. In the following, likewise, reference will generally be made to permanent magnets which constitute a particularly economical embodiment of the majority of the devices according to the invention, it being understood that the field created by a permanent magnet may well be induced by another device and in particular by an electro-magnetic (even ferromagnetic) device. In the following, this equivalence will therefore not be insisted upon except in the cases where one or the other of these types of embodiment may considerably influence the performances of the process and of the corresponding apparatus.

The present invention therefore essentially consists in placing magnetic elements in relative movement with respect to a fluid laden with particles, fluid and particles here being taken in the senses which were both defined hereinabove.

The magnetic elements may themselves be constituted by magnets, i.e. objects of magnetic material, generally ferromagnetic, capable of creating a sufficiently important magnetic field to cause a disturbance in a fluid laden with particles. The importance of the effects produced will to a large extent depend on the intensity of the magnetic field created and this comes within the domain of the man skilled in the art who will modulate the intensity or the intensities of the magnetic field or fields as a function of the effects which he desires to produce. Nonetheless, experience shows that the majority of the precharged elements on the market have a sufficient effect in the majority of current applications of the present invention. These magnetic elements may also be in the form of micro-magnets and in particular magnetic powder fixed in a support, for example in a plastic or rubber-coated support which may be a magnetic and which facilitates positioning thereof as will be seen in the examples described hereinbelow. Such supports are moreover henceforth found on the market due to the number of their applications in particular in the mechanical domain. Concerning the relative arrangement of the magnetic elements, it should be recalled that, if two magnetic elements tend to join by their opposite polarities, which tends to displace the lines of force of the magnetic field directly from one magnet to the other, when magnetic elements are placed so that their ends of the same polarity approach each other, repulsion forces are indeed created which may be annihilated by the reaction of the common support but such an arrangement makes it possible to move the lines of force apart and to cause the effects of the intensity of the field to be taken much further. This is well known, for example, in the devices for magnetically closing household appliances. It is therefore obvious that, in the present invention, where it is sought to give the magnetic field the most important role possible, the approach of magnetic elements by their poles of the same signs may render, in the majority of cases, the fields much more efficient and at a greater distance from the magnetized elements which produce them.

These supports of magnetic material may be disposed on fixed parts of an installation in which a fluid circulates but it may also be imagined to place them, in accordance with the present invention, on mobile parts such as for example on rotating pump parts, on paddle wheels with propeller or blades which may be driven by an outside system or by the movement of the fluid itself.

These magnetic elements may also be borne by necessarily mobile parts of the installation such as washing machine drums or dish-washer blades. As has already been emphasized, these magnetic elements may, of course, be borne by fixed parts of the installation on which the fluid circulates. If a line of force of a magnetic field is perpendicular to the direction of displacement of particles, the effect obtained will be maximum. The smaller the angle of inclination between the direction of displacement of a particle and the line of force, the smaller the effect obtained will itself be. There is therefore interest in causing all the fluid flow to circulate the most perpendicularly possible with respect to the lines of force, in the case of it being desired to go in the sense of non-scaling and the most favourable solubility. However, this subject of angular orientation will be referred to again hereinafter.

If successive magnetic fields are used, it is obvious that, in order to obtain the most important effects, it is desirable to have successive magnetic fields of alternate polarities. Now, as has just been emphasized, magnetic elements of which the parts closest to one another are of the same polarities, create a much more effective magnetic field. It is therefore desirable if, in the series of the polarities encountered by a particle, two North poles are for example encountered, followed by two South poles, the passage from a North pole to a South pole corresponding to the normal passage from one end of a magnetic element to the other. If, therefore, for example, it is desired to dispose elongated magnetic elements parallel to one another and with a circulation of a fluid perpendicularly to the general direction of these magnetic elements, there is interest in having two magnetic elements oriented in the same direction succeeded, in the majority of cases, by two magnetic elements oriented in opposite direction, so that, at each series of ends of these magnetic elements, successions of the type NNSSNNSS . . . will be encountered.

If, on the contrary, it is desired to use bands of successive, parallel supports containing small magnets, there is interest, in the same spirit, in distributing, within each band, the small magnets turned in the same direction, i.e. with all the South poles on one side and all the North poles on the other, and in alternating the polarities from one band to the following parallel band so that, still with a circulation of a fluid perpendicular to the bands, said circulation successively encounters two North poles, two North poles two South poles, two South poles, etc . . .

If such magnetic elements or such magnetic element supports and the particles are in relative movement, these particles are subjected to some extent to a periodical magnetic field of which the "wave length" is directly associated with the physical distance between bands of magnetic elements with polarities oriented in the same manner. If this arrangement is considered without taking into account the speed of the fluid, the "wave length" corresponds to the "pitch" between two support bands. i.e. to the distance between their median axes, fixed on a common part of the installation. If the fluid moves, time will intervene and the frequency of encounter of the successive magnetic fields will increase proportionally to the speed, with the result that the frequency and consequently the relative "wave length" may be varied as a function of the relative speed between the fluid and the magnetic fields or the magnetic elements creating these fields. In this way, for example, a magnetic field may be available, produced by supports on the basis of a "wave length" of the order of 1 millimeter to 1 meter, i.e. waves extending from the millimeter wave to the meter wave, wavelengths which will vary, as a function of the relative speed, as to the effect of the magnetic fields on the particles conveyed by the fluid.

As has already been mentioned, and in application of Ampere's laws, the more the movement of the particles is orthogonal to the lines of magnetic flux, the more the effect obtained is important, since it is the sine of the angle between the direction of displacement of the particles and the lines of magnetic flux which comes proportionally into play in all the calculations of the effects produced. The process according to the invention therefore essentially consists in causing fluids laden with particles in the sense defined hereinabove, fluids and particles to circulate along magnetic elements and preferably as orthogonally as possible with respect to the lines of force of a magnetic field, this field being created by at least one magnetic element and, in a preferred variant of the invention, by a succession of magnetic elements creating periodical, preferably alternate magnetic fields. As has already been emphasized, it may be imagined, within the scope of the present invention, that the elements be permanent magnets or be elements of magnetic, for example ferromagnetic material, excited by any adequate means, such as circuits and in particular turns through which electric currents pass. It is also possible to create magnetic fields by any other adequate means not necessarily employing magnetic materials, but for example simple coils.

Experience has shown that, in the use of the devices and processes according to the invention, the relative displacement tends to increase the effects of salvation, all the more so as one approaches orthogonality in this displacement, and the effects of precipitation when one approaches parallelism. It is therefore to be noted that if, in the most frequent case, it is sought to avoid precipitations, one will approach orthogonality as much as possible, bearing in mind the fact that if, in certain cases or in certain zones, it is desired to get rid of components, for example by precipitation, it suffices to organize arrangements and relative movements in order to approach parallelism. In this way, in the case of an oblique relative movement, depending on the relative importance of the orthogonal speed component and the parallel speed component, one may play on one and the other plane and solvate in one direction of circulation whilst precipitating in a transverse direction.

In summary, it may be considered that the present invention principally concerns a process for the magnetic treatment of fluid by fluid circulation in a magnetic field, characterized in that fluid and at least one magnetic field are in relative displacement, any particle conveyed by the fluid being subjected to at least one important variation of the field, the relative trajectories of the particles being oblique with respect to the lines of force of the fields.

According to this process, the relative trajectories of the particles are angularly oriented with respect to the lines of force of the fields under conditions which depend on the object envisaged, i.e. rathermore solvation and non-scaling or, on the contrary, precipitation.

A relative movement is preferably provoked between the fluid and at least one surface presenting successive magnetic elements producing successive magnetic fields, so that each particle conveyed by the fluid is successively subjected to the action of the successive magnetic fields produced by the successive magnetic elements.

The particles may thus be subjected to successive fields of low intensity and of high intensity and/or to successive fields of which the polarities alternate. The fields may be fixed and/or mobile in space. They may be created by permanent magnets and/or by electrical circuits, for example with the aid of electro-magnets . . .

An ionic solution may thus be circulated or a fluid laden with micro-organisms, to subject them to the action of the magnetic fields.

The relative speed of circulation of the fluid with respect to the surface presenting the successive magnetic elements may be varied in order correlatively to vary the frequency of action of the magnetic fields.

The invention also relates to the devices for carrying out the process, presenting the characteristic arrangements necessary to attain that end. Such devices for the magnetic treatment of fluid by fluid circulation in a magnetic field are therefore characterized in that fluid and at least one magnetic field are in relative displacement, any particle conveyed by the fluid being subjected to at least one important variation of the field, the relative trajectories of the particles being oriented angularly with respect to the lines of force of the fields and, preferably substantially orthogonal to the lines of force of the fields if solvation and elimination of scaling or other deposit is sought, or rathermore parallel if precipitation is rathermore sought.

According to a preferred embodiment of the device according to the invention, a relative movement is provoked between the fluid and at least one surface presenting successive magnetic elements producing successive magnetic fields so that each particle constituting the fluid or conveyed thereby is successively subjected to the action of the successive magnetic fields produced by the successive magnetic elements.

The particles may thus be subjected to successive fields of low intensity and of high intensity, and/or to successive fields of which the polarities alternate, these fields being able to be fixed and/or mobile in space. They may be created by permanent magnets and/or by electrical circuits, particularly by electro-magnets.

In the devices according to the invention, the relative speed of circulation of the fluid with respect to the surface presenting the successive magnetic elements may be varied in order correlatively to vary the frequency of action of the magnetic fields. The magnetic elements may be constituted by adjacent bands extending substantially perpendicularly to the direction of the relative movement between the fluid and said surface, the spacing of the magnetic elements of the same polarity (N—N, S—S) preferably being included in a range of wave lengths going from the millimeter waves to the meter waves and it preferably corresponds to a centimeter wave.

According to a preferred variant embodiment of devices according to the invention, a support material is employed, containing adjacent and preferably parallel magnetic elements, constituting bands of alternate polarities (N,S). The bands constituting the magnetic elements may also be disposed in radiating manner about a central point or the surface presenting the bands constituting the magnetic elements may form a tube inside which the fluid circulates, the magnetic bands forming successive transverse circles.

The magnetized bands may thus successively encircle a central orifice.

The fluid may be contained in an envelope of good electrical conductivity, for example metallic, particularly stainless steel, in contact with the successive magnetic elements.

It will be noted that the devices according to the invention may also include devices in which the particles encounter the lines of force of magnetic field, created by magnetic elements connected to one or more supports, with the result that the particles intersect the successive lines of force and are subjected to variations in intensity of the field during the relative movement between fluid and device. A device according to the invention may present one or more surfaces covered by the fluid in relative movement with respect to said surface, the latter being made of a material offering on said surface successive lines of magnetization at alternate polarities, one by one or two by two, and presenting an angle with the direction of flow of the fluid along said surface which is as close as possible to orthogonality.

The invention also concerns the fluids treated by the process and the devices according to the invention, in particular when they thus acquire inherent characteristics: for example, improved solvent powers may be obtained; mention may also be made of the fluids conveying micro-organisms which see these latter inhibited by the treatment, which gives them specific properties as to their aseptic character. Experience has shown that it is thus possible to treat certain organic media and to inhibit certain evolutions provoked by the micro-organisms that they contain, with the result that the processes and the devices according to the invention may ensure a role of stabilizer of solutions, of suspensions or of organic emulsions for example.

In order to understand the technical characteristics and the advantages of the present invention more readily, embodiments will be described, it being understood that they are not limiting as to their implementation and to the applications that may be made thereof.

Reference will be made to the following Figures in which.

EXAMPLE 1

Figure 1:
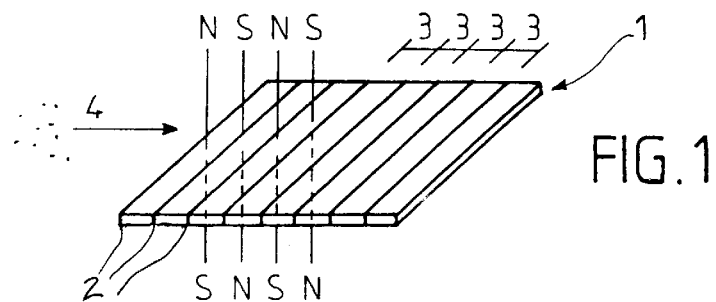
FIG. 1 is a view in perspective of a plane device according to the invention.

As shown in FIG. 1, a foil, film or sheet 1, preferably of insulating and magnetic polymer, presents adjacent transverse bands 2 of the same width 3, with alternate magnetic polarities. These bands 2 are charged with small magnets oriented alternately NS/SN, perpendicularly to the plane of the sheet 1. In other words, the successive bands 2 present upper polar faces alternately having polarities N,S,N,S . . . and lower polar faces alternately having polarities S,N,S,N . . . If particles 4 circulate in a fluid along the surface of sheet 1, preferably at right angles to bands 2, they alternately encounter magnetic fields with polarity varying periodically, of which the "half wave length" is equal to the width 3 between bands 2, i.e. to the distance between the median axes of successive bands 2 of opposite polarities, the "wave length" being equal to double this distance, i.e. to the distance between the median axes of two successive bands 2 of the same polarity.

As emphasized hereinabove, the relative displacement of the particles 4 with respect to the sheet 1 subjects the particles to magnetic field alternations in time of which the frequency increases with the relative speed. If, for example, a sheet or foil such as 1 is placed on a sloping surface, the bands 2 being horizontal and the fluid, for example water, which may pour thereon, flowing along the line of greatest inclination (arrow of FIG. 1), it is ascertained that the conduits which are placed downstream for the descent of the water are virtually not scaled and, in certain cases, become descaled (if they were previously scaled).

EXAMPLE 2

Figure 2:
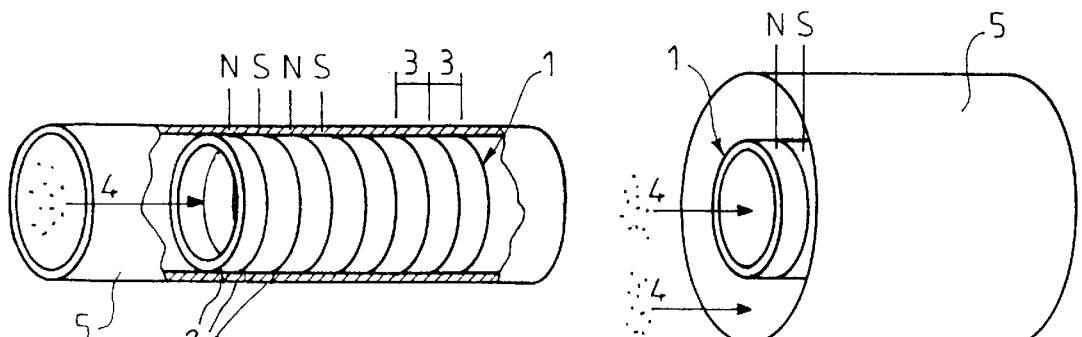
FIG. 2 is a view in perspective of a cylindrical device according to the invention.
Figure 3:
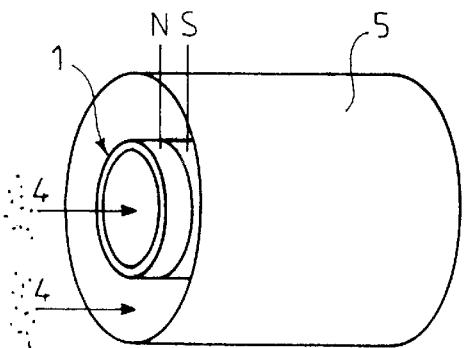
FIG. 3 is a view in perspective of a variant of a cylindrical device.

As shown in FIG. 2, the foil, film or sheet 1 of FIG. 1 is wound on itself to form a tube and it is engaged, in this tubular form, inside a tube 5 of internal diameter equal to the outer diameter of the tubular sheet 1. The magnetized bands 2 then form adjacent circles located in successive transverse planes with respect to the axis of the tube formed. The tubular sheet 1 may be fixed on the inner wall of the tube 5 by any adequate means or simply applied freely against the wall.

If water is made to circulate in the tube 5 containing the tubular device 1, a considerable reduction of the tendency to scaling is observed.

EXAMPLE 3

The tubular device 1 of FIG. 2 is fixed, not directly on the inner wall of the tube 5, but concentrically, at a distance, by any adequate means. The active surface of the sheet 1 constituting the tubular device is thus doubled as well as the corresponding effect.

In the three examples above, in addition to the descaling mentioned, there was experimentally ascertained a variation in the viscosity of the water which, after treatment according to the invention, presents an increased fluidity and a substantial reduction in the duration of heating necessary for reaching boiling point (reduced by 20 to 30%) was obtained. Furthermore, this goes with a substantial increase in the solvent power and therefore salvation. Moreover, a considerable bacterial sterilization was also ascertained.

EXAMPLE 4

A central evacuation in a plane, a cone or a pyramid, with downwardly directed apex, may give rise to various arrangements as shown in FIGS. 4A, 4B, 4C and 4D.

Figure 4A:
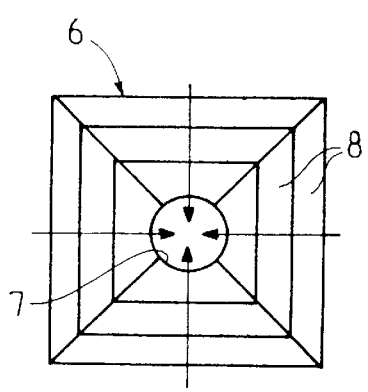
FIGS. 4A, 4B, 4C and 4D are schematic plan views of devices according to the invention, provided for a flow of a fluid through a central orifice in a plane, a cone or a pyramid, with downwardly turned apex.

The device shown in FIG. 4A comprises a plane sheet 6 pierced with an opening 7 and which comprises magnetized bands 8, with alternate polarities, extending in two perpendicular directions. The magnetized bands 8 are joined, thus constituting squares surrounding the central opening 7, centred on this opening and imbricated in one another. The flow of a fluid and/or of particles to be treated is effected in the direction of the central opening 7, in the direction of the arrows shown in FIG. 4A, transversely with respect to the various magnetized bands 8.

Figure 4B:
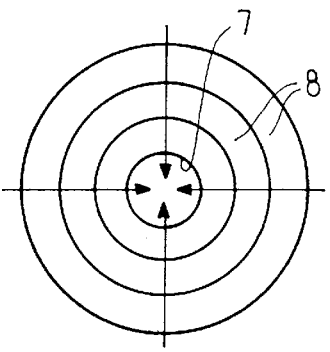

FIG. 4B shows a variant embodiment in which the magnetized bands 8, with alternate polarities, constitute adjacent circles centred on the opening 7 that they surround, the directions of flow then being radial as illustrated by the arrows of FIG. 4B.

Figure 4C:
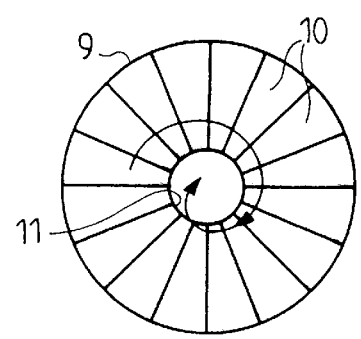

FIG. 4C shows a variant embodiment of a device 9 in the form of a funnel, i.e. truncated. In that case, the particles and/or the fluid to be treated are introduced substantially tangentially to the upper part of the funnel 9 so as to effect an eddying movement inside said funnel, as indicated by the arrows. The adjacent magnetized bands 10, with alternate polarities, are then constituted by successive segments, oriented along the generatrices of the frustum of cone, of the lateral wall of the funnel 9 whose lower orifice or small base 11 constitutes the outlet orifice for the particles and/or the fluid treated.

In the preceding Examples, solvation and elimination of scaling or equivalent deposits were systematically sought. As has already been mentioned, it is possible to play on the angular orientation of the relative displacement of the particles with respect to the lines of force of the field.

Figure 4D:
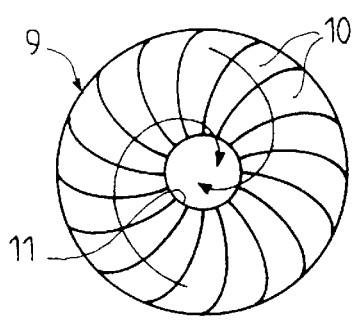

In the variant embodiment shown in FIG. 4D, the adjacent magnetized bands 10, with alternate polarities, of the funnel-shaped device 9, each have a spiral shape forming an angle with the lines of flow of the fluid materialized by the arrows. This angle is close to 90° if solvation is sought, but, as noted above, it is possible also to seek, at least partially, a precipitation and one may tend more or less towards 0° depending on whether it is desired to have a more or less high proportion of precipitate and therefore a more or less low proportion of salvation.

EXAMPLE 5

Figure 5:
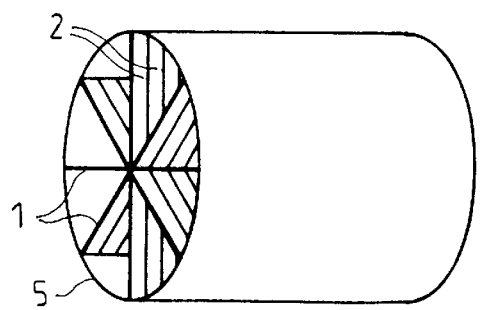
FIG. 5 is a view in perspective of a conduit equipped with a device with radial plates according to the invention.

Sheets or plates 1 according to the invention may also be used, which are used in batteries. FIG. 5 shows a conduit 5 in which are mounted radial rigid plates or sheets 1 of which the magnetized bands 2, with alternate polarities, are transversal. This arrangement considerably increases the active surface and increases the effects as much. It will be noted that the radial plates or bands 2 may extend over the whole of the diameter of the conduit 5 or only over part of this diameter, from the periphery, thus leaving the centre of the conduit clear.

EXAMPLE 6

Figure 6:
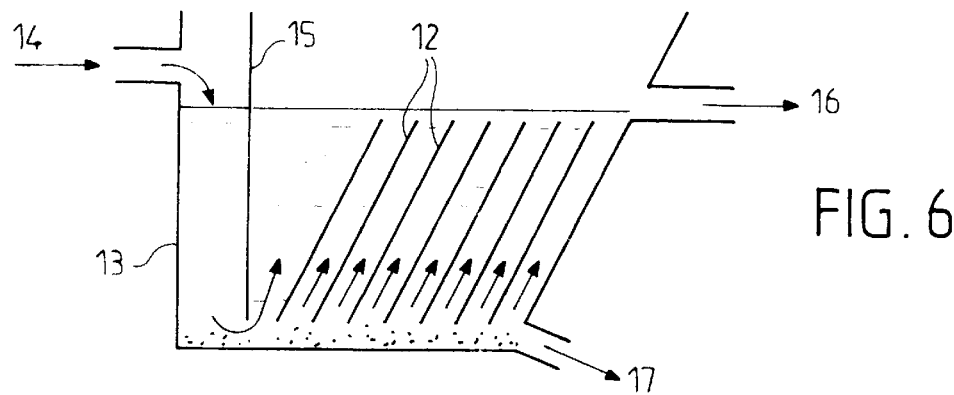
FIG. 6 is a schematic view in vertical section of a device comprising a battery of parallel plates housed in a decantation tank.

As shown in FIG. 6, parallel plates 12 may be mounted, still in batteries, in a decantation tank 13. This decantation tank 13 presents an admission 14 for water to be treated, an upper partition 15 dividing the tank 13 into two upstream and downstream parts, and allowing the water to pass in the lower part. The plates 12 according to the invention are mounted parallel to one another in the downstream part of the tank 13, at a distance above the bottom of the tank 13, their magnetized bands, with alternate polarities, preferably being horizontal, i.e. perpendicular to the plane of the Figure. The treated water leaves in the upper part at 16 and the slurries are recovered at 17 in the lower part. The results obtained experimentally with such a decantation tank are particularly noteworthy.

EXAMPLE 7

Figure 7:
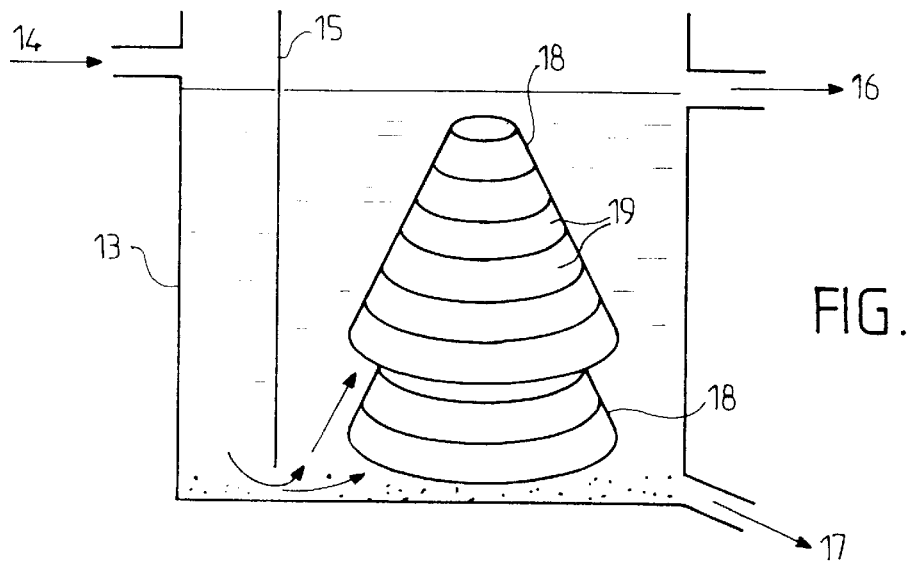
FIG. 7 is a schematic view in vertical section of a decantation tank equipped with truncated devices according to the invention.

Equivalent results were obtained with devices such as the one illustrated in FIG. 7 where constituent elements of FIG. 6 are found again with the same references. Here, the devices according to the invention are constituted by one or more conical frusta 18 superposed and/or juxtaposed, convergent upwardly. The magnetized bands 19, with alternate polarities, of each conical frustum 18 are then constituted by adjacent rings of the lateral wall of the frustum of cone.

EXAMPLE 8

Figure 8:
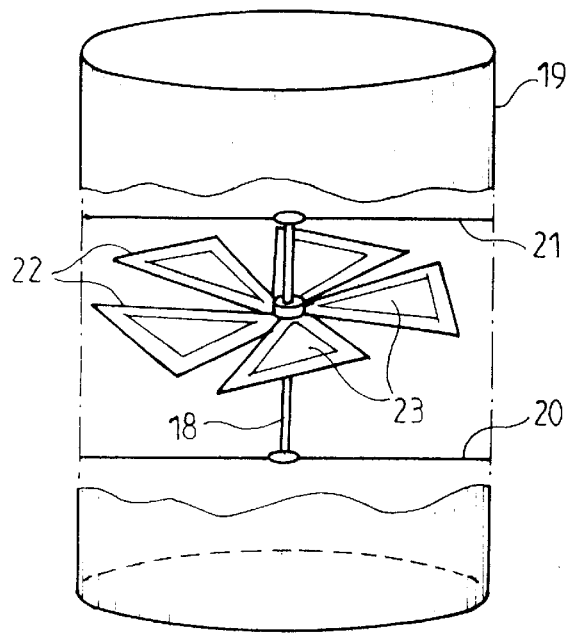
FIG. 8 is a view in perspective, with parts torn away, of a conduit equipped with a paddle wheel according to the invention.

The device shown in FIG. 8 comprises a shaft 18 mounted to rotate about the axis of a pipe 19, by means of adequate supports 20 and 21. On shaft 18 is fitted an assembly of blades 22 forming a paddle-wheel which is driven in rotation by the circulation of a fluid in the pipe 19. On each blade, there is mounted one or more magnetized magnetic elements 23 whose opposite North and South poles are adjacent the substantially radial edges of the blades 22. The North pole of each blade is adjacent the North pole of the following blade and the same applies to the South poles. In this way, as mentioned above, the lines of force between two adjacent North poles extend substantially normally to the plane containing the two North poles of two successive poles and the same applies to the successive South poles. In this way there is obtained a series of lines of force of alternate signs going from a pair of North poles, to the two adjacent South poles and thus presenting, upon circulation of the fluid, an assembly of lines of force which are fairly efficient, as to their action, on the particles, charged or not, conveyed by the fluid. If, in the device shown in FIG. 8, the paddle wheel constituted by the blades 22 is coaxial with the pipe 19, a device may well be imagined where the axis of the paddle wheel is perpendicular to the axis of the pipe 16 and where, for example, the blades 22 present the appearance rather of blades of bladed wheels than propeller blades as is the case shown in FIG. 8. It is obvious that, with a device such as that of FIG. 8, the more the circulation of fluid is rapid, the more the mobile equipment constituted by the assembly of blades 22 rotates rapidly since it functions a velocimeter, which increases the frequency of action of the magnetic fields on the particles which traverse them, accordingly.

Such devices were able to be used experimentally in all cases where scaling is a hindrance (washing machines, coffee-making machines, for example). A substantial increase in the results were also ascertained in all agricultural domains where water distributed by the mains is used and where the prior treatment according to the invention contributes a considerable improvement in the quality of the water, with the results following therefrom and in particular an increased speed of growth and a better vivacity of the plants. The same applies in very different technical domains such as for example in building where the setting, quality and mechanical properties of the concrete, plaster or of numerous types of mortars, are improved by the use of water treated according to the present invention.

The sterilization of micro-organisms has already been emphasized hereinabove, which, of course, reduces the pathogenic effects of the water treated according to the present invention.

It will be emphasized that, in all the Examples cited, the fluids to be treated are made to circulate over fixed devices. However, in accordance with a variant, the fluid may be fixed and the magnetic elements producing the magnetic fields are in that case mobile with respect to the fixed fluid. It is also possible to increase the relative speed between the fluid laden with particles and the device, for example by causing to rotate in the fluid plane, cylindrical or conical devices according to the invention whose magnetized bands extend along generatrices.

Finally, it will be specified that the results furnished by the present process and the devices for carrying it out are largely amplified when the fluid is contained in an envelope of good electrical conductivity in contact with the successive magnetic elements. In an advantageous variant of the invention, an envelope of stainless steel may thus be used.

I claim:

1. A device for the magnetic treatment of a fluid flowing through a working enclosure, comprising:

a working enclosure having an inner surface, a flexible sheet means positioned within said working enclosure relative to said flowing fluid through said working enclosure and having an inner surface surrounding a central opening and an outer surface proximate to the inner surface of said working enclosure, said sheet means including adjacent magnetized band means extending coaxially about an axis, said adjacent band means forming part of said sheet means and being equally spaced apart from each other and being each of the same width as measured in a direction parallel to said axis;

wherein each of said band means contains a plurality of small magnets polarized in a single direction normal to inner and outer surfaces of said sheet means, each of said band means including a first polar face means of a first polarity and a second polar face means of a second polarity opposite said first polarity, wherein the polarity of the first polar face means of one of said band means is opposite to that of the polarity of the first polar face means of an adjacent band and the polarity of the second polar face means of said one band means is opposite to that of the polarity of the second polar face means of said adjacent band means.

2. The device of claim 1, wherein an outer surface of said sheet means has a diameter equal to the internal diameter of said working enclosure and is engaged with the inner surface of the working enclosure.

3. The device of claim 1, wherein said sheet means is formed of a flexible magnetic polymer.

4. The device of claim 1, wherein said band means includes magnetic bands formed from an insulating and magnetic polymer, whereby said particles (4) in said fluid are circulated at right angles to said bands (2).

5. A method for magnetically treating a fluid comprising the steps of providing the device according to claim 1;

passing a fluid through said working enclosure and along said sheet means to magnetically treat said fluid.

* * * * *